(12) United States Patent
Tong et al.

(10) Patent No.: US 7,120,395 B2
(45) Date of Patent: Oct. 10, 2006

(54) MIMO COMMUNICATIONS

(75) Inventors: Wen Tong, Ottawa (CA); Ming Jia, Ottawa (CA); Peiying Zhu, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 372 days.

(21) Appl. No.: 10/689,433

(22) Filed: Oct. 20, 2003

(65) Prior Publication Data

US 2005/0085195 A1  Apr. 21, 2005

(51) Int. Cl.
*H04B 7/00* (2006.01)

(52) U.S. Cl. .................. 455/101; 455/69; 455/561; 455/562.1; 375/349

(58) Field of Classification Search ............ 455/562.1, 455/101, 70, 103; 370/334; 375/349, 299
See application file for complete search history.

(56) References Cited

U.S. PATENT DOCUMENTS

| | | | | |
|---|---|---|---|---|
| 6,580,926 | B1* | 6/2003 | Levy .......................... | 455/564 |
| 6,917,820 | B1* | 7/2005 | Gore et al. ............... | 455/562.1 |
| 2003/0003880 | A1* | 1/2003 | Ling et al. .................... | 455/92 |
| 2003/0161282 | A1 | 8/2003 | Medvedev et al. ......... | 370/329 |
| 2004/0002364 | A1* | 1/2004 | Trikkonen et al. ....... | 455/562.1 |
| 2004/0023621 | A1* | 2/2004 | Sugar et al. ................ | 455/103 |
| 2004/0171385 | A1* | 9/2004 | Haustein et al. ............ | 455/450 |
| 2005/0003863 | A1* | 1/2005 | Gorokhov ................ | 455/562.1 |
| 2005/0085269 | A1* | 4/2005 | Buljore et al. ........... | 455/562.1 |

FOREIGN PATENT DOCUMENTS

| | | |
|---|---|---|
| EP | 0951091 A2 | 10/1999 |
| EP | 1185001 A2 | 6/2002 |
| WO | 01/78254 A1 | 10/2001 |
| WO | 01/95531 A2 | 12/2001 |

OTHER PUBLICATIONS

International Search Report for PCT/GB2004/004443 mailed Jan. 26, 2005.

* cited by examiner

*Primary Examiner*—George Eng
*Assistant Examiner*—Brandon J. Miller
(74) *Attorney, Agent, or Firm*—Withrow & Terranova, PLLC (57) ABSTRACT

The present invention allows a wireless communication system, such as a base station, to select N antennas from an associated group of M antennas for transmitting multiple streams of data to a given user. Based on the channel conditions between the M antennas of the wireless communication system and the multiple antennas at the receiver, the N antennas to use for transmission are selected to enhance channel capacity, signal-to-noise ratios, or a combination thereof. The channel conditions are measured at the receiver, and may be sent back to the wireless communication system for processing or may be processed at the receiver, wherein instructions are transmitted back to the wireless communication system to control antenna selection.

36 Claims, 9 Drawing Sheets

MIMO COMMUNICATIONS

FIELD OF THE INVENTION

The present invention relates to wireless communications, and in particular to selectively choosing a select number of antennas within a larger array through which to transmit data to a receiver, as well as techniques for reinforcing transmitted signals using available antennas.

BACKGROUND OF THE INVENTION

Spatial diversity is typically a function of the number and placement of transmit and receive antennas relative to a transmitter and receiver. Systems employing spatial diversity with multiple transmit and receive antennas are generally referred to as multiple-input multiple-output (MIMO) systems. Accordingly, a transmitting device will have M transmit antennas, and the receiving device will have N receive antennas. A common MIMO transmission technique transmits different data from different transmit antennas. This transmission technique, which is often referred to as V-BLAST (Vertical-Bell Laboratories Layered Space Time), increases system throughput for systems having sufficient diversity available. Further information related to BLAST techniques can be found in Siavash M. Alamouti, "A Simple Transmit Diversity Technique for Wireless Communications," IEEE J. Select. Areas Commun., vol. 16, pp. 1451–1458, Oct. 1998; G. J. Foschini, "Layered Space-time Architecture for Wireless Communications in a Fading Environment when Using Multi-element antennas," Bell Labs Tech. J., pp. 41–59, Autumn 1996; G. D. Golden, G. J. Foschini, R. A. Valenzuela, and P. W. Wolniansky, "Detection Algorithm and Initial Laboratory Results Using V-BLAST Space-time Communication Architecture," Electronics Letters, vol. 35, pp. 14–16, Jan. 1999; and P. W. Wolniansky, G. J., Foschini, G. D. Golden, and R. A. Valenzuela, "V-BLAST: An Architecture for Realizing Very High Data Rates Over the Rich-scattering Wireless Channel," Proc. IEEE ISSSE-98, Pisa, Italy, Sep. 1998, pp. 295–300, which are incorporated herein by reference.

Interference and fading are significant impediments to achieving high data rates in today's wireless communication systems and is particularly problematic in MIMO systems. Given the tendency for channel conditions to sporadically and significantly fade, communication resources are conservatively allocated, leaving excessive amounts of communication resources unused most of the time.

In cellular embodiments, the transmitter at a base station will typically be associated with more antennas than are used to receive transmitted signals at the receiver of a user element. As the user element moves or environmental conditions change, the channel conditions between any one of the transmit antennas and the receive antennas may significantly change. As such, at any given moment there are communication channels between the transmit and receive antennas that are better than others. In an effort to capitalize on those channels providing better transmission conditions, there is a need for a technique to facilitate transmissions from the transmitter to the receiver in a manner taking advantage of these more favorable channel conditions. Further, there is a need to provide signal reinforcement in the communication channel to provide a beam-forming effect in an efficient manner in a MIMO system, and in particular in a MIMO system incorporating BLAST encoding and decoding.

SUMMARY OF THE INVENTION

The present invention allows a wireless communication system, such as a base station, to select N antennas from an associated group of M antennas for transmitting multiple streams of data to a given user. Based on the channel conditions between the M antennas of the wireless communication system and the multiple antennas at the receiver, the N antennas to use for transmission are selected to enhance channel capacity, signal-to-noise ratios, or a combination thereof. The channel conditions are measured at the receiver, and may be sent back to the wireless communication system for processing or may be processed at the receiver, wherein instructions are transmitted back to the wireless communication system to control antenna selection.

In an alternative embodiment, one or more of the M antennas, other than the selected N antennas, may be used to redundantly transmit corresponding data streams. The redundant data streams are weighted in a manner allowing the redundant data stream to reinforce a corresponding data stream transmitted from one of the N antennas in the transmission channel. Further, the primary data stream, which is to be reinforced, may also be weighted prior to transmission. The preferred space-time coding uses BLAST transmission techniques.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention optimizes multiple-input multiple-output (MIMO) transmissions wherein there are more transmit antennas than receive antennas. In operation, channel conditions associated with each of the transmission paths from the M transmit antennas to the N receive antennas are either known or provided to the transmitter. Based on the channel information, the M×N MIMO system is reduced to an N×N MIMO subsystem, wherein only N of the M transmit antennas are used for transmitting data to the receiver. In one embodiment, the unselected transmit antennas may be used for reinforcing transmissions from the N transmit antennas. Prior to delving into the details of the invention, an overview of a MIMO environment is provided.

Figure 1:
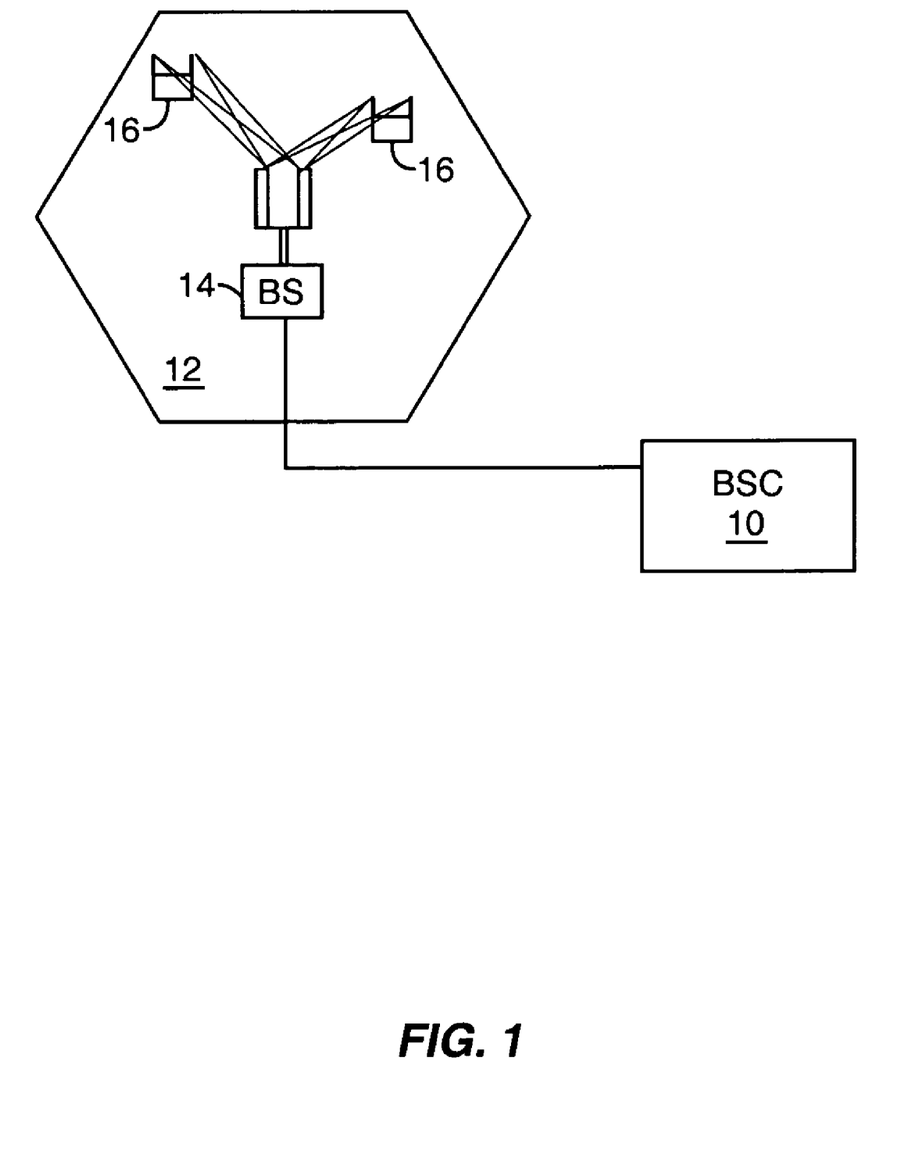
FIG. 1 is a block representation of a wireless communication system according to one embodiment of the present invention.

With reference to FIG. 1, a basic MIMO wireless communication environment is illustrated. In general, a base station controller (BSC) 10 controls wireless communications within one or more cells 12, which are served by corresponding base stations (BS) 14. Each base station 14 facilitates communications with user elements 16, which are within the cell 12 associated with the corresponding base station 14. For the present invention, the base stations 14 and user elements 16 include multiple antennas to provide spatial diversity for communications. Notably, the base station 14 may be any type of wireless access point for cellular, wireless local area network, or like wireless network.

Figure 2:
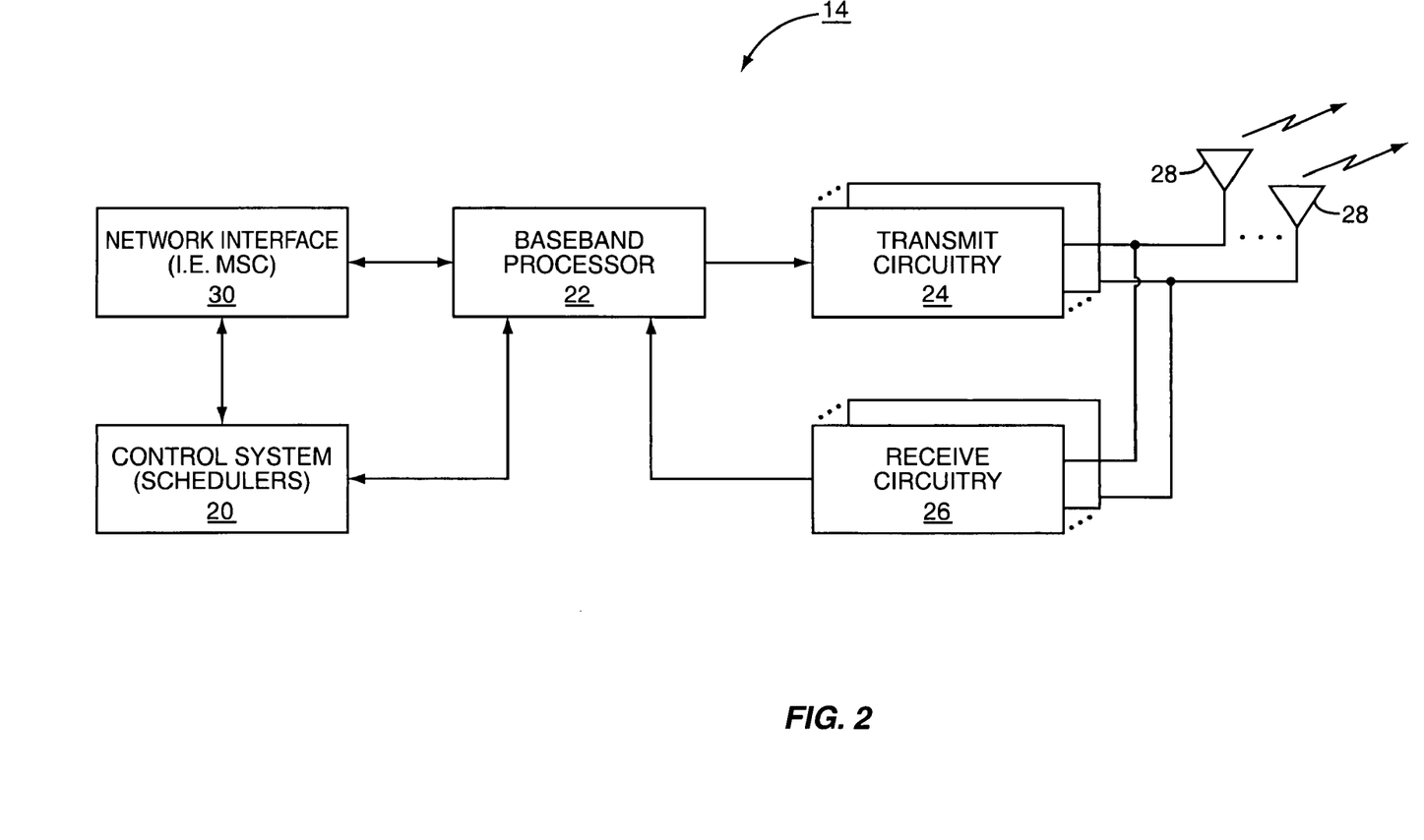
FIG. 2 is a block representation of a base station according to one embodiment of the present invention.

With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals through antennas 28 bearing information from one or more remote transmitters provided by user elements 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs). The received information is then sent across a wireless network via the network interface 30 or transmitted to another user element 16 serviced by the base station 14. The network interface 30 will typically interact with the base station controller 10 and a circuit-switched network forming a part of a wireless network, which may be coupled to the public switched telephone network (PSTN).

On the transmit side, the baseband processor 22 receives digitized data, which may represent voice, data, or control information, from the network interface 30 under the control of the control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). The multiple antennas 28 and the replicated transmit and receive circuitries 24, 26 provide spatial diversity. Antenna selection, modulation, and processing details are described in greater detail below.

Figure 3:
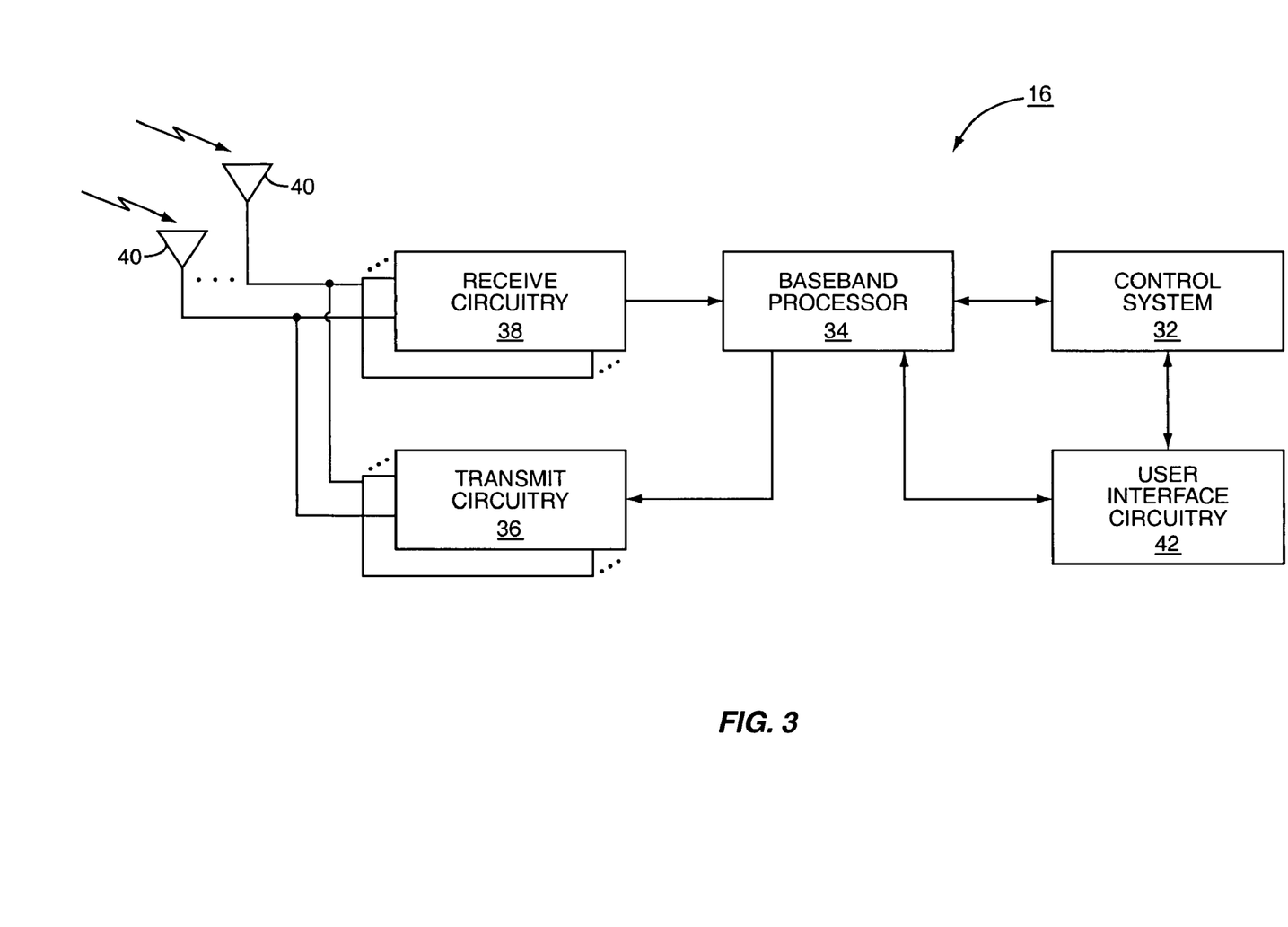
FIG. 3 is a block representation of a user element according to one embodiment of the present invention.

With reference to FIG. 3, a user element 16 configured according to one embodiment of the present invention is illustrated. Similarly to the base station 14, the user element 16 will include a control system 32, a baseband processor 34, transmit circuitry 36, receive circuitry 38, multiple antennas 40, and user interface circuitry 42. The receive circuitry 38 receives radio frequency signals through antennas 40 bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). The multiple antennas 40 and the replicated transmit and receive circuitries 36, 38 provide spatial diversity. Modulation and processing details are described in greater detail below.

Figure 4:
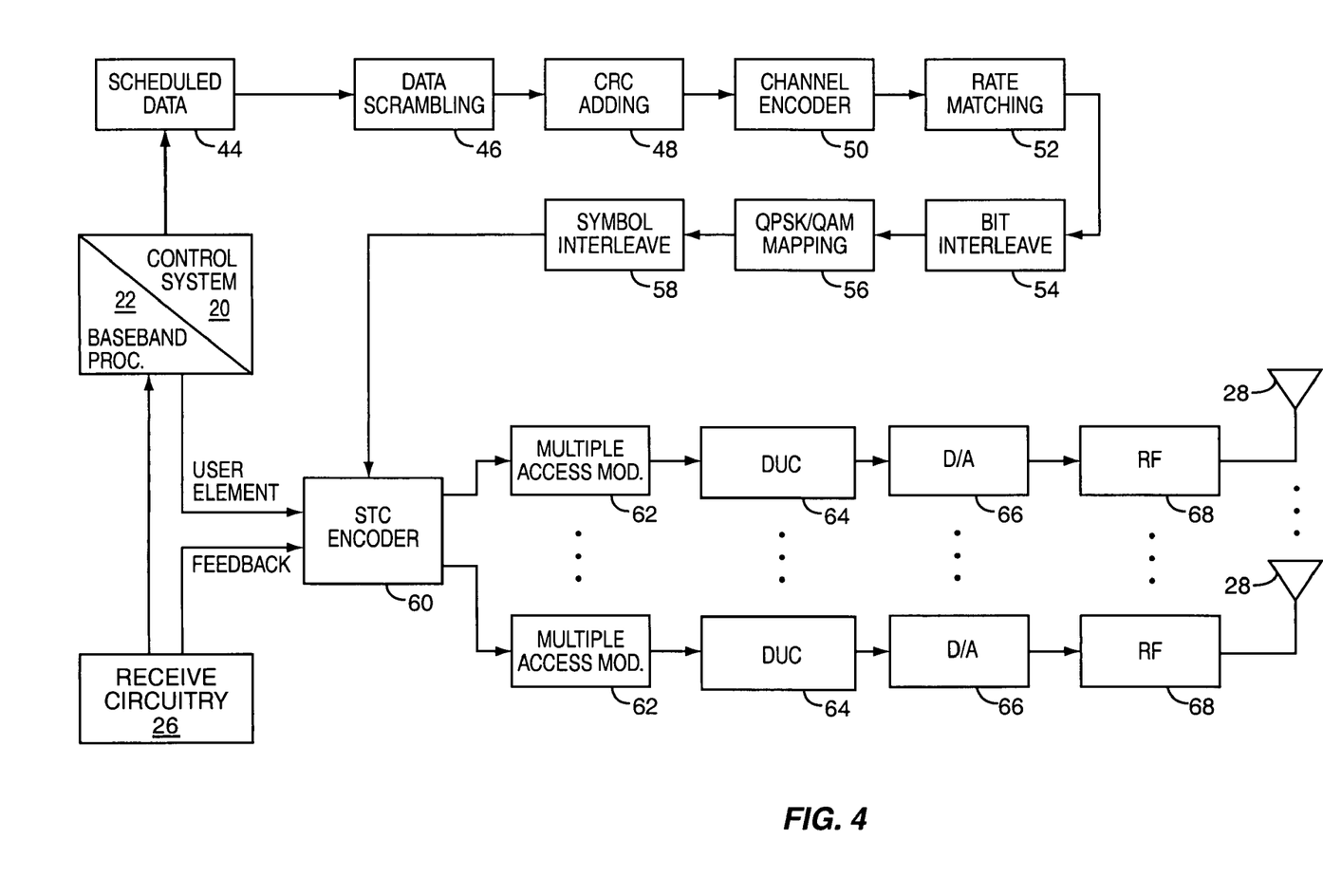
FIG. 4 is a logical breakdown of a transmitter architecture according to one embodiment of the present invention.

With reference to FIG. 4, a logical transmission architecture is provided according to one embodiment. The transmission architecture is described as being that of the base station 14, but those skilled in the art will recognize the applicability of the illustrated architecture for both uplink and downlink communications. Further, the transmission architecture is intended to represent a variety of multiple access architectures, including, but not limited to code division multiple access (CDMA), frequency division multiple access (FDMA), time division multiple access (TDMA), and orthogonal frequency division multiplexing (OFDM).

Initially, the base station controller 10 sends data 44 intended for a user element 16 to the base station 14 for scheduling. The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the user element 16. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, a form of Quadrature Amplitude Modulation (QAM) or Quadrature Phase Shift Key (QPSK) modulation is used. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. Blocks of symbols are then processed by space-time code (STC) encoder logic 60. The STC encoder logic 60 will process the incoming symbols according to a selected STC encoding mode and provide n outputs corresponding to the number of transmit antennas 28 for the base station 14. Further detail regarding the STC encoding is provided later in the description. Assume the symbols for the n outputs are representative of the data to be transmitted and capable of being recovered by the user element 16. Further detail is provided in A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803–1810, 1998; R. van Nee, A. van Zelst and G. A. Atwater, "Maximum Likelihood Decoding in a Space Division Multiplex System", IEEE VTC. 2000, pp. 6–10, Tokyo, Japan, May 2000; and P. W. Wolniansky et al., "V-BLAST: An Architecture for Realizing Very High Data Rates over the Rich-Scattering Wireless Channel," Proc. IEEE ISSSE-98, Pisa, Italy, Sep. 30, 1998 which are incorporated herein by reference in their entireties.

For illustration, assume the base station 14 has selected two of a number of antennas 28 (n=2) and the STC encoder logic 60 provides two output streams of symbols. Accordingly, each of the symbol streams output by the STC encoder logic 60 is sent to a corresponding multiple access modulation function 62, illustrated separately for ease of understanding. Those skilled in the art will recognize that one or more processors may be used to provide such analog or digital signal processing alone or in combination with other processing described herein. For example, the multiple access modulation function 62 in a CDMA function would provide the requisite PN code multiplication, wherein an OFDM function would operate on the respective symbols using inverse discrete Fourier transform (IDFT) or like processing to effect an Inverse Fourier Transform. Attention is drawn to co-assigned application Ser. No. 10/104,399, filed Mar. 22, 2002, entitled SOFT HANDOFF FOR OFDM, for additional OFDM details, and to RF Microelectronics by Behzad Razavi, 1998 for CDMA and other multiple access technologies, both of which are incorporated herein by reference in their entirety.

Each of the resultant signals is up-converted in the digital domain to an intermediate frequency and converted to an analog signal via the corresponding digital up-conversion (DUC) circuitry 64 and digital-to-analog (D/A) conversion circuitry 66. The resultant analog signals are then simultaneously modulated at the desired RF frequency, amplified, and transmitted via the RF circuitry 68 and antennas 28. Notably, the transmitted data may be preceded by pilot signals, which are known by the intended user element 16. The user element 16, which is discussed in detail below, may use the pilot signals for channel estimation and interference suppression and the header for identification of the base station 14.

Figure 5:
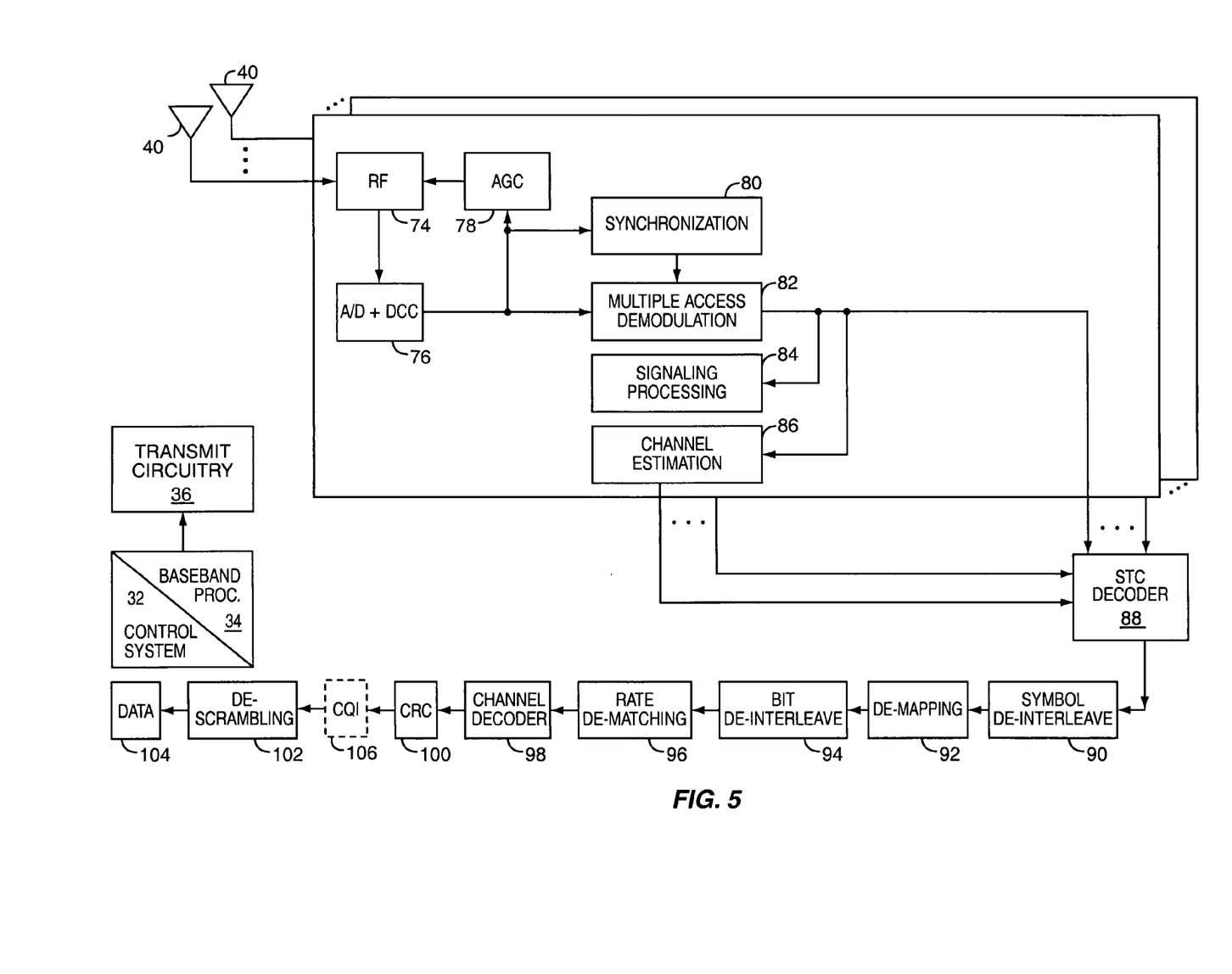
FIG. 5 is a logical breakdown of a receiver architecture according to one embodiment of the present invention.

Reference is now made to FIG. 5 to illustrate reception of the transmitted signals by a user element 16. Upon arrival of the transmitted signals at each of the antennas 40 of the user element 16, the respective signals are demodulated and amplified by corresponding RF circuitry 74. For the sake of conciseness and clarity, only one of the multiple receive paths in the receiver is described and illustrated in detail. Analog-to-digital (A/D) conversion and downconversion circuitry (DCC) 76 digitizes and downconverts the analog signal for digital processing. The resultant digitized signal may be used by automatic gain control circuitry (AGC) 78 to control the gain of the amplifiers in the RF circuitry 74 based on the received signal level.

The digitized signal is also fed to synchronization circuitry 80 and a multiple access demodulation function 82, which will recover the incoming signal received at a corresponding antenna 40 at each receiver path. The synchronization circuitry 80 facilitates alignment or correlation of the incoming signal with the multiple access demodulation function 82 to aid recovery of the incoming signal, which is provided to a signaling processing function 84 and channel estimation function 86. The signal processing function 84 processes basic signaling and header information to provide information sufficient to generate a channel quality measurement, which may bear on an overall signal-to-noise ratio for the link, which takes into account channel conditions and/or signal-to-noise ratios for each receive path.

The channel estimation function 86 for each receive path provides channel responses corresponding to channel conditions for use by an STC decoder 88. The symbols from the incoming signal and channel estimates for each receive path are provided to the STC decoder 88, which provides STC decoding on each receive path to recover the transmitted symbols. The channel estimates provide sufficient channel response information to allow the STC decoder 88 to decode the symbols according to the STC encoding used by the base station 14.

The recovered symbols are placed back in order using the symbol de-interleaver logic 90, which corresponds to the symbol interleaver logic 58 of the base station 14. The de-interleaved symbols are then demodulated or de-mapped to a corresponding bitstream using de-mapping logic 92. The bits are then de-interleaved using bit de-interleaver logic 94, which corresponds to the bit interleaver logic 54 of the transmitter architecture. The de-interleaved bits are then processed by rate de-matching logic 96 and presented to channel decoder logic 98 to recover the initially scrambled data and the CRC checksum. Accordingly, CRC logic 100 removes the CRC checksum, checks the scrambled data in traditional fashion, and provides it to the de-scrambling logic 102 for de-scrambling using the known base station de-scrambling code to recover the originally transmitted data 104.

A channel quality indicator (CQI) may be determined based on the recovered data. An additional or alternative CQI function 106 may be provided anywhere along the data recovery path (blocks 90 through 104) to monitor signal-to-noise ratios, error rates, and like to derive information bearing on individual or overall channel quality. Additional information on one exemplary way to determine a CQI value is provided in co-assigned application Ser. No. 60/329,511, filed Oct. 17, 2001, and entitled "METHOD AND APPA-

RATUS FOR CHANNEL QUALITY MEASUREMENT FOR ADAPTIVE MODULATION AND CODING."

The following describes the overall functionality of the present invention and refers to the primary device used for transmission as the transmitter and the device used for receiving as the receiver. At any given time depending on the direction of primary communications, the base station 14 and the user elements 16 may be a transmitter, receiver, or both.

As noted, a MIMO system is one where information is transmitted from M transmit antennas and received at N receive antennas. As such, there are multiple transmit channels associated with each antenna. The transfer function for each one of these individual channels is represented by $h_{ij}$, wherein i=1 through N and j=1 through M. The overall MIMO system can be expressed by:

$$y = H_{N \times M} x + n, \text{ wherein:} \qquad \text{Eq. 1}$$

$x = [x_1 x_2 \ldots x_M]^T$, which represents the channel input;
$y = [y_1 y_2 \ldots y_N]^T$, which represents the channel output;
$n = [n_1 n_2 \ldots n_N]^T$, which represents channel noise; and $$H = \begin{bmatrix} h_{11} & h_{12} & \cdots & h_{1M} \\ h_{21} & h_{22} & \cdots & h_{2M} \\ \vdots & \vdots & \ddots & \vdots \\ h_{N1} & h_{N2} & \cdots & h_{NM} \end{bmatrix},$$

which represents a matrix of the individual channel transfer functions corresponding to actual channel conditions.

From the above, the capacity of the MIMO channel can be estimated, such as by using the Shannon equation:

$$C_{Shannon} = \log_2 \left( \det \left( I_N + \frac{\rho}{N} H H' \right) \right) \text{bps/Hz}, \qquad \text{Eq. 2}$$

which is limited by the min{M,N}, wherein I is an identity matrix of order N, π is the expected SNR per receiving antenna and H' is the conjugate transpose of H. For M>N, a Maximum Likelihood Decoder may be used to recover MIMO signals; however, the complexity of Maximum Likelihood Decoding increases exponentially with respect to QAM size and the number of transmit antennas, M. For this reason, the preferred embodiment limits the number of individual BLAST data streams, referred to hereinafter as transmitted layers, L, are limited to min {M, N}. With this limitation, zero forcing, minimum mean square error, or a simplified maximum likelihood decoder decoding may be used, such as provided in co-assigned U.S. application Ser. No. 10/263,268 filed Oct. 2, 2003 and co-assigned U.S. application Ser. No. 10/261,739 filed Oct. 1, 2003, which are incorporated herein by reference in their entireties.

Accordingly, when M>N, the number of layers L is limited to the number of receive antennas N(L=N). In a first embodiment of the present invention, an N×N subsystem is selected from the M×N overall system. In other words, N of the M transmit antennas are selected for transmitting the respective layers. Preferably, the N transmit antennas are selected to maximize system capacity or signal-to-noise ratios. The Shannon capacity equation may be used to select the most appropriate N×N subsystem, wherein $C_M^N$ represents the total number of possible subsystem choices, and denotes the number of combinations by taking N transmit antennas out of a pool of M transmit antennas. Since the channel capacity of a MIMO system depends not only on the attenuation associated with the channels but also on the actual condition of the channel matrix, the system diversity order for the MIMO system is in fact $C_M^N$, wherein the system diversity order is the number of distinct channel matrices that can define an N×N MIMO subsystem.

Figure 6A:
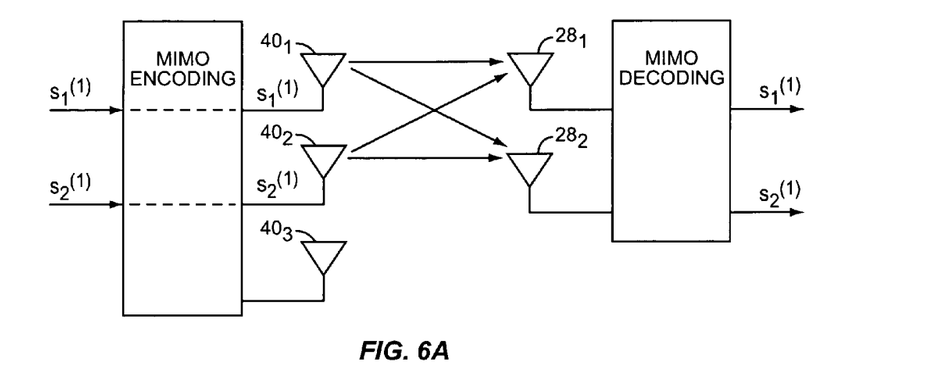
FIGS. 6A through 6C illustrate exemplary transmission diversity arrangements according to a first embodiment of the present invention.
Figure 6B:
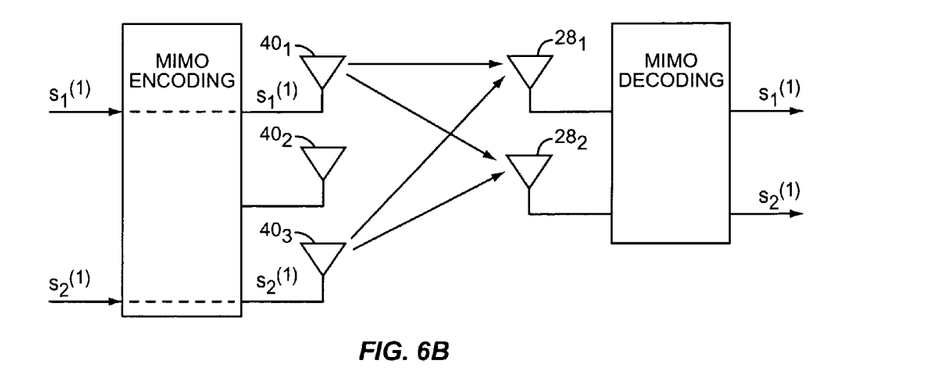
Figure 6C:
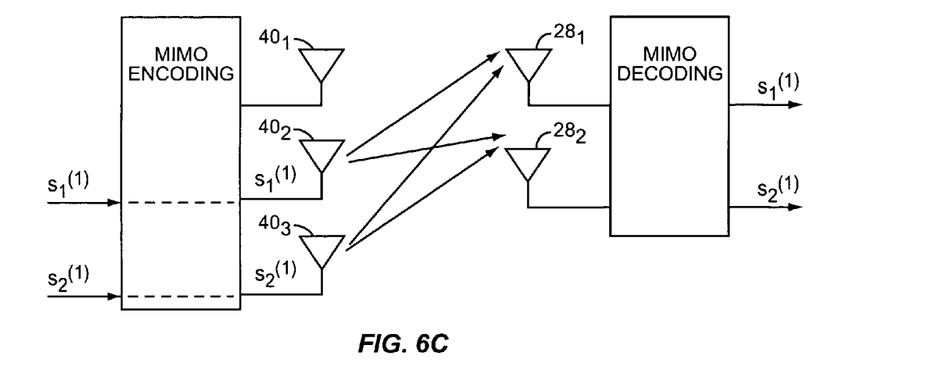

For a 3×2 MIMO system defined by, $$H = \begin{bmatrix} h_{11} & h_{12} & h_{13} \\ h_{21} & h_{22} & h_{23} \end{bmatrix}; \qquad \text{Eq. 3}$$

by defining $$H_{12} = \begin{bmatrix} h_{11} & h_{12} \\ h_{21} & h_{22} \end{bmatrix} \quad H_{13} = \begin{bmatrix} h_{11} & h_{13} \\ h_{21} & h_{23} \end{bmatrix} \quad H_{23} = \begin{bmatrix} h_{12} & h_{13} \\ h_{22} & h_{23} \end{bmatrix}, \qquad \text{Eq. 4}$$

and selecting the sub-system $H_{ij}$ that satisfies $$|\det(H_{ij})| = \max\{|\det(H_{12})|, |\det(H_{13})|, |\det(H_{23})|\}, \qquad \text{Eq. 5}$$

the most robust 2×2 MIMO sub-system, of the three possible sub-systems is selected. In essence, the subsystem associated with the most favorable channel conditions is selected to transmit the BLAST layers to the user element 16. In this embodiment, one of the three transmit antennas is not used during transmission. As channel conditions change, the unused transmit antenna may change, as illustrated in FIGS. 6A–6C. Assume that the data within the various BLAST layers are represented by $S_1^{(1)}$ and $S_2^{(1)}$. In FIG. 6A, the data $S_1^{(1)}$ for the first BLAST layer is transmitted via antenna 40₁ and the BLAST data for the second layer $S_2^{(1)}$ is transmitted from antenna 40₂. Transmit antenna 40₃ will not transmit data in association with the other layers. Signals transmitted from transmit antennas 40₁ and 40₂ are received at both receive antennas 28₁ and 28₂, and are decoded to recover the original data $S_1^{(1)}$ and $S_2^{(1)}$. In FIG. 6B, transmit antenna 40₂ is not active, wherein the data $S_1^{(1)}$ and $S_2^{(1)}$ are respectively transmitted from transmit antennas 40₁ and 40₃. In FIG. 6C, transmit antenna 40₁ is unused, and the data $S_1^{(1)}$ and $S_2^{(1)}$ is transmitted from transmit antennas 40₂ and 40₃. In this embodiment, N transmit antennas from the pool of M transmit antennas are chosen to take advantage of the most favorable channel conditions, preferably to either optimize throughput, signal-to-noise ratios, or a combination thereof.

In another embodiment of the present invention, the unused or spare transmit antennas of the previous embodiment are used to achieve additional gain for one or more of the N layers. In essence, a spare transmit antenna is used to redundantly transmit data being transmitted over another of the transmit antennas in a manner wherein the primary layer information transmitted from a first transmit antenna is effectively combined in the channel with the redundantly transmitted information from the spare transmit antennas to effectively reinforce transmission of the given layer. The data transmitted from the spare antenna is weighted to achieve a desired gain. The technique of transmitting the same data simultaneously from multiple transmit antennas in a manner intended to allow the energy of the multiple transmitted signals to combine in the channel in a constructive fashion to provide additional gain is referred to as beam-forming. In general, one or more of the transmit antennas used to transmit a single layer will be associated with weighting, wherein the data is weighted prior to transmission to achieve the desired gain.

In general, beam-forming seeks to increase the signal-to-noise ratio at a receiver. Consider a scenario of M=2 transmit antennas with one intended receiver. Let the channel matrix to the desired receiver be given by ($h_1$ $h_2$). Beam-forming will induce weights $$w_1 = \frac{h_1^*}{\sqrt{|h_1|^2 + |h_2|^2}}$$

and $$w_2 = \frac{h_2^*}{\sqrt{|h_1|^2 + |h_2|^2}}$$

at the transmitter, where $h_1^*$ and $h_2^*$ are the conjugates of $h_1$ and $h_2$ respectively.

If s is the intended transmit signal for the receiver k, then $w_1 s$ and $w_2 s$ are transmitted from two transmit antennas, respectively. The intended user receives the signal:

$$r_k = h_1 w_1 s + h_2 w_2 s + n_k = \sqrt{|h_1|^2 + |h_2|^2} s + n_k, \quad \text{Eq. 6}$$

where $n_k$ is the noise. As such, the effect of beam-forming is similar to Maximum Ratio Combining (MRC) in space.

Note that with this beam-forming concept, only space coherent signal combining is provided at one receive antenna. Since all the receive antennas are affected by the weighting coefficients at the transmitter, the signals at other receive antennas are still superimposed onto each other with random phases.

Let us take a 3×2 MIMO system as an example. Assume that $H_{12}$ is the sub-system that has been selected according to the antenna switching criteria described in equation 4. To take advantage of the third spare transmit antenna to further improve the system SNR through beam-forming, there are two choices to make, namely, identifying the layer to enhance and the transmit antenna used to form the beam. Considering layer-2 and receive antenna-2, the modified sub-system becomes:

$$H_{12}^{(22)} = \begin{bmatrix} h_{11} & \frac{h_{12}h_{22}^* + h_{13}h_{23}^*}{\sqrt{|h_{22}|^2 + |h_{23}|^2}} \\ h_{21} & \sqrt{|h_{22}|^2 + |h_{23}|^2} \end{bmatrix}, \quad \text{Eq. 7}$$

where the superscript in $H_{ij}^{(mn)}$ indicates beam-forming on the mth layer and nth receive antenna. Note that although the formed sub-system has enhanced the layer-2 signal energy, $|\det(H_{12}^{(22)})|$ is not guaranteed to increase. Therefore, there is a need to select the system with $$\max_{m,n}\{|\det(H_{ij}^{(mn)})|\}.$$

If $$\max_{m,n}\{|\det(H_{ij}^{(mn)})|\} > |\det(H_{ij})|,$$

then beam-forming can be used to improve the system capacity. From the above, the gain from receive antenna based beam-forming in an MIMO environment is somewhat limited, as the gain in one element of $H_{ij}$ does not necessary translates into the gain in $|\det(H_{ij})|$. However, if beam-forming is provided at the layer level, the value of $|\det(H_{ij})|$ can indeed be improved.

Again, consider a 3×2 MIMO system, and assume that $H_{12}$ is the sub-system that has been selected according to the above described transmit antenna selection criteria. By forming a 'beam' with $2^{nd}$ and $3^{rd}$ columns (here (mn)), in $H_{ij}^{(mn)}$ are the column indexes used for beam-forming purpose), $$H_{12}^{(23)} = \begin{bmatrix} h_{11} & w_1 h_{12} + w_2 h_{13} \\ h_{21} & w_1 h_{22} + w_2 h_{23} \end{bmatrix}, \quad \text{Eq. 8}$$

and $$\begin{aligned} \det(H_{12}^{(23)}) &= h_{11}(w_1 h_{22} + w_2 h_{23}) - h_{21}(w_1 h_{12} + w_2 h_{13}) \\ &= w_1(h_{11}h_{22} - h_{21}h_{12}) + w_2(h_{11}h_{23} - h_{21}h_{13}) \\ &= w_1 \det(H_{12}) + w_2 \det(H_{13}) \end{aligned} \quad \text{Eq. 9}$$

By using the beam-forming principle, setting $$w_1 = \frac{\det^*(H_{12})}{\sqrt{|\det(H_{12})|^2 + |\det(H_{13})|^2}} \quad \text{Eq. 10}$$

$$w_2 = \frac{\det^*(H_{13})}{\sqrt{|\det(H_{12})|^2 + |\det(H_{13})|^2}},$$

results in $$\det(H_{12}^{(23)}) = \sqrt{|\det(H_{12})|^2 + |\det(H_{13})|^2}. \quad \text{Eq. 11}$$

The gain of beam-forming in terms of SNR is given by $$\chi = \frac{\det(H_{12}^{(23)}(H_{12}^{(23)})')}{\det(H_{12}H_{12}')} = 1 + \frac{|\det(H_{13})|^2}{|\det(H_{12})|^2}. \quad \text{Eq. 12}$$

Since $|\det(H_{13})| < |\det(H_{12})|$, hence the maximum gain from beam-form is 3 dB. Note that equation 11 is in fact an extension of the traditional beam-forming—if $\det(H_{12})$ and $\det(H_{13})$ are viewed as two individual paths in a 2×1 Multiple-Input Single-Output (MISO) system.

As stated earlier, for a 3×2 MIMO system, there are three potential sub-systems, which are defined by $H_{12}$, $H_{13}$, and $H_{23}$. Assuming that $H_{ij}$ and $H_{ik}$ are the sub-systems that satisfy $$|\det(H_{ij})| + |\det(H_{ik})| = \max\{|\det(H_{ij})| + |\det(H_{ik})|, |\det(H_{ij})| + |\det(H_{jk})|, |\det(H_{ik})| + |\det(H_{jk})|\}, \quad \text{Eq. 13}$$

then by beam-forming with the jth and kth columns of H, and setting the weights to $$w_j = \frac{\det^*(H_{ij})}{\sqrt{|\det(H_{ij})|^2 + |\det(H_{ik})|^2}}$$ Eq. 14 and $$w_k = \frac{\det^*(H_{ik})}{\sqrt{|\det(H_{ij})|^2 + |\det(H_{ik})|^2}}$$

$$\det(H_{ij}^{(jk)}) = \sqrt{|\det(H_{ij})|^2 + |\det(H_{ik})|^2},$$ Eq. 15 respectively, and the gain in terms of SNR is $$\chi = \frac{\det(H_{ij}^{(jk)}(H_{ij}^{(jk)})')}{\det(H_{ij}H_{ij}')} = 1 + \frac{|\det(H_{ik})|^2}{|\det(H_{ij})|^2}.$$ Eq. 16

Equation 16 shows that compared to a 2×2 system, a 3×2 system provides not only additional diversity gain, but that additional transmit antenna can also be used for layer-based beam-forming, thus further improving the system capacity. This gain is based on beam-forming in an MIMO environment. For example, let the channel matrix be $$H = \begin{bmatrix} 0.3+0.1i & -0.2+0.3i & 0.34-0.17i \\ -0.7-0.2i & 0.5-0.1i & -0.23-0.47i \end{bmatrix},$$ Eq. 17 then $$|\det(H_{12})|=0.1942 \, |\det(H_{23})|=0.1480 \, |\det(H_{12})|=0.3297.$$ Eq. 18

By beam-forming on the $2^{nd}$ and $3^{rd}$ columns of H, $$\begin{cases} w_1 = -0.1045 - 0.4965i \\ w_2 = 0.6533 + 0.5619i \end{cases},$$ Eq. 19 and the equivalent 2×2 channel matrix $$H_{13}^{(23)} = \begin{bmatrix} h_{11} & w_1h_{12}+w_2h_{13} \\ h_{21} & w_1h_{22}+w_2h_{23} \end{bmatrix}$$ Eq. 20

$$= \begin{bmatrix} 0.3+0.1i & 0.4875+0.1479i \\ -0.7-0.2i & 0.0119-0.6741i \end{bmatrix}.$$

It can be verified that $$|\det(H_{13}^{(23)})|^2 = |\det(H_{13})|^2 + |\det(H_{12})|^2,$$ Eq. 21 and the beam-forming gain for this example is 1.29 dB.

Figure 7A:
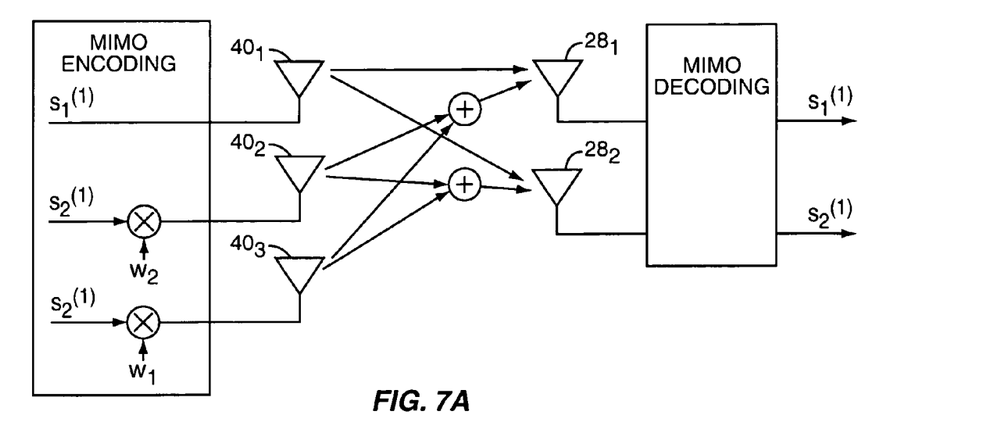
FIGS. 7A through 7C illustrate exemplary beam-forming arrangements according to a second embodiment of the present invention.
Figure 7B:
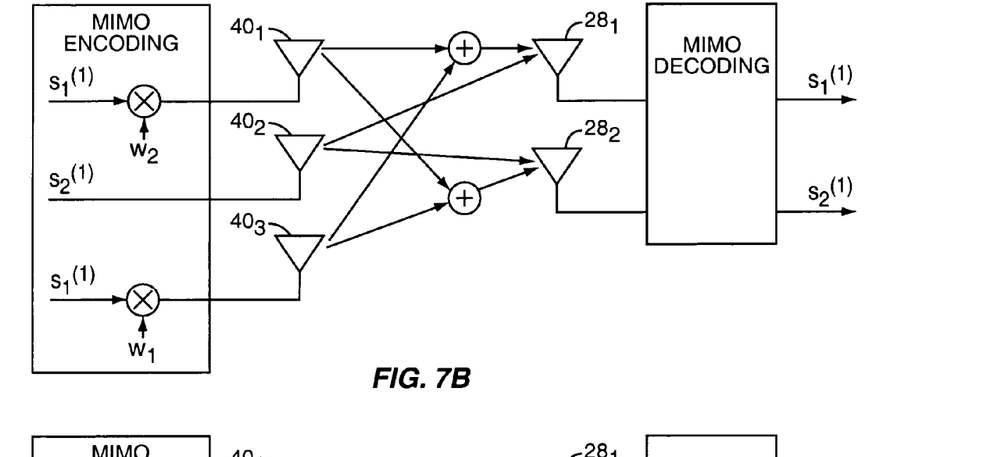
Figure 7C:
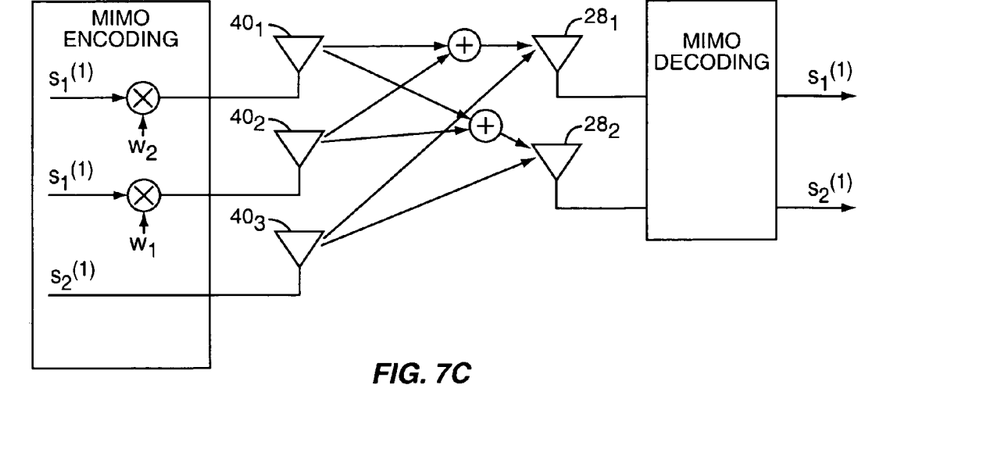

The beam-forming concept is illustrated in FIGS. 7A–7C. With particular reference to FIG. 7A, assume that there are three transmit antennas $40_1$–$40_3$ and two layers (L=2) for transmitting to the receiver. The layers are represented by $S^{1(1)}$ and $S_2^{(1)}$, respectively. During MIMO encoding, the data $S_1^{(1)}$ is transmitted from transmit antenna $40_1$, while the data $S_2^{(1)}$ is weighted with the weighting factors $W_2$ and $W_1$, respectively, prior to being transmitted simultaneously from transmit antennas $40_2$ and $40_3$. The data transmitted from transmit antennas $40_2$ and $40_3$ combine during transmission to effectively reinforce each other and provide a stronger signal at the receiver. Notably, the weighting factors can be calculated to optimize channel capacity, signal-to-noise ratios, or a combination thereof. Further, one of the weighting factors $W_1$ or $W_2$ can be 1. FIGS. 7B and 7C provide alternative configurations wherein beam-forming is provided on the data associated with layer 1, $S_1^{(1)}$, and the weighted data is transmitted from transmit antennas $40_1$ and $40_2$, respectively (FIG. 7B) or transmit antennas $40_1$, and $40_3$ (FIG. 7C).

The above concepts can be extended to any M×N MIMO system; however, optimal beam-forming is provided when a redundant or spare transmit antenna is used to reinforce a single layer. In other words, the spare transmit antenna cannot transmit data to reinforce multiple layers.

To illustrate this point, consider a 4×2 system wherein the following will show that an optimal beam-forming scenario for more than one layer from a single transmit antenna does not exist. Assume the 4×2 MIMO system is defined by:

$$H = \begin{bmatrix} h_{11} & h_{12} & h_{13} & h_{14} \\ h_{21} & h_{22} & h_{23} & h_{24} \end{bmatrix}$$ Eq. 22 and is used to form an equivalent 2×2 system, with beam-forming based on the first and second columns as well as the third and fourth columns. The resultant channel matrix takes the form $$H_{(1,2),(3,4)} = \begin{bmatrix} w_1h_{11}+w_2h_{12} & w_3h_{13}+w_4h_{14} \\ w_1h_{21}+w_2h_{22} & w_3h_{23}+w_4h_{24} \end{bmatrix},$$ Eq. 23 and $$\det(H_{(1,2),(3,4)}) = w_1w_3\det(H_{13})+w_2w_3\det(H_{23})+w_1w_4\det(H_{14})+w_2w_3\det(H_{23}).$$ Eq. 24

Defining $$\begin{cases} w_1w_3 = \det^*(H_{13}) \\ w_2w_3 = \det^*(H_{23}) \\ w_1w_4 = \det^*(H_{14}) \\ w_2w_4 = \det^*(H_{24}) \end{cases},$$ Eq. 25 equation set 25 does not have a solution, unless $$\det(H_{13})\det(H_{24})=\det(H_{14})\det(H_{23}).$$ Eq. 26

This conclusion can be extended to the general M×N case. From linear algebra theory, when beam-forming is applied to L layers, $$w_{i_1}w_{i_2}\ldots w_{i_L} = \det^*(H_{i_1i_2\ldots i_L}),$$ Eq. 27 where $i_1, i_2, \ldots, i_L$ are column index combinations from each of the beam-forming layers. Similar to equation set 25, equation set 26 does not have a solution. However, a solution for one-layer beam-forming always exists. Assume that M−N=K, and the columns used for beam-forming are $i_1, i_2, \ldots, i_K$. Denoting $\{H_{i_k}, k=1, \ldots, K\}$ as the matrix that is formed by deleting all the beam-forming columns except for the $i_k$th column from the original channel matrix H, then according to linear algebra theory, $$\det(H_{bf}) = \sum_{k=1}^{K} w_k \det(H_{i_k}). \quad \text{Eq. 28}$$

By setting $$w_k = \frac{\det^*(H_{i_k})}{\sqrt{\sum_{k=1}^{K} |\det(H_{i_k})|^2}}, \quad k = 1, 2, \ldots, K, \quad \text{Eq. 29}$$

the following is true:

$$\det(H_{bf}) = \sum_{k=1}^{K} w_k \det(H_{i_k}) \quad \text{Eq. 29}$$
$$= \sqrt{\sum_{k=1}^{K} |\det(H_{i_k})|^2}.$$

Let $H_s$ be the sub-system selected according to the antenna switching criteria, and assume that $H_s \in \{H_{i_k}, k=1, \ldots, K\}$; then the gain of beam-forming is given by:

$$\chi = \frac{\det(H_{bf} H'_{bf})}{\det(H_s H'_s)} = 1 + \sum_{\substack{i=1 \\ i \neq s}}^{K} |\det(H_{i_k})|. \quad \text{Eq. 30}$$

From equation 30, it can be seen that it has the same format as beam-forming in the MISO case. Thus, to achieve maximal channel capacity, beam-forming configuration should be selected according to the following condition:

$$\max_{i_1, i_2, \ldots, i_K} \sum_{k=1}^{K} |\det(H_{i_k})|^2. \quad \text{Eq. 31}$$

Figure 8A:
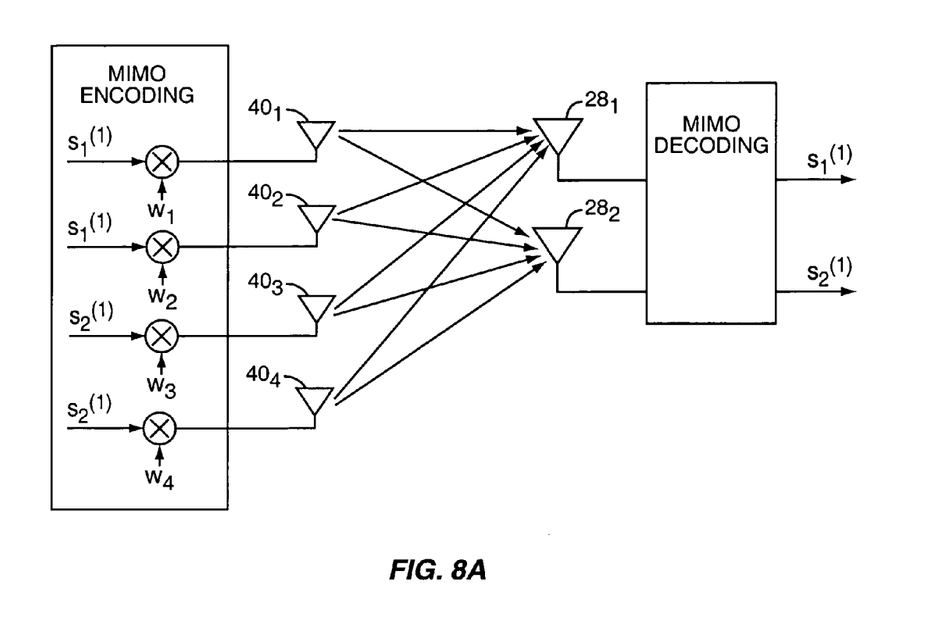
FIGS. 8A through 8C illustrate exemplary beam-forming arrangements according to a third embodiment of the present invention.
Figure 8B:
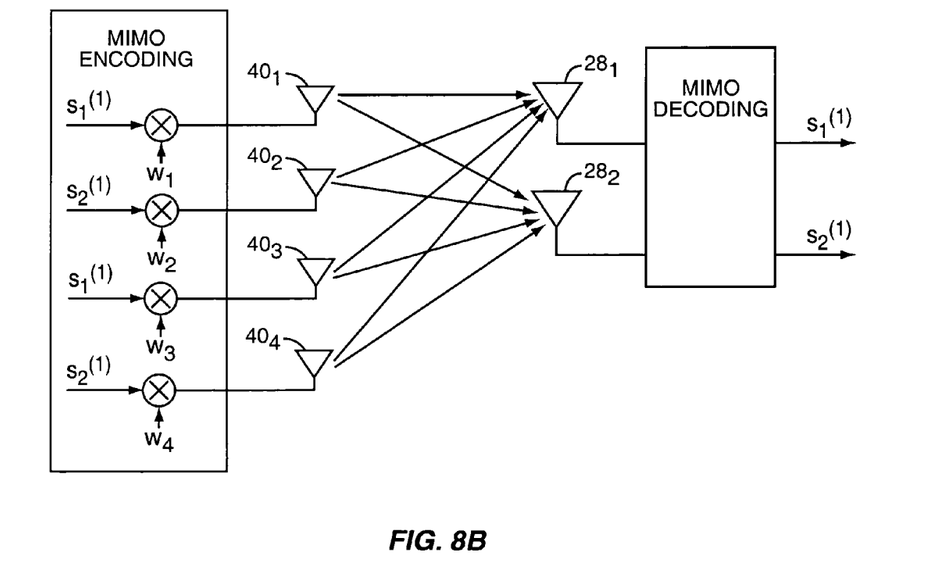
Figure 8C:
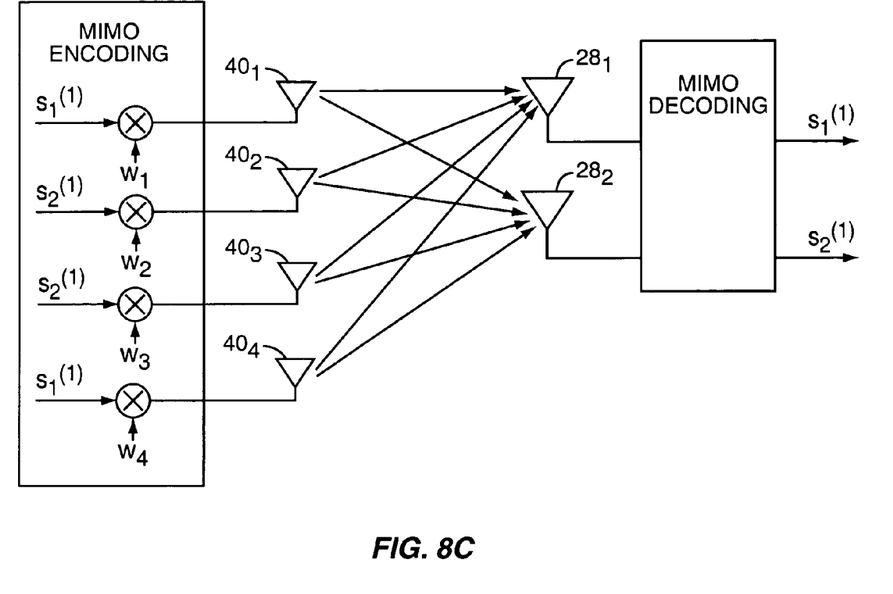

A practical illustration of the above is shown in FIGS. 8A–8C. With particular reference to FIG. 8A, a 4×2 MIMO system is provided, which is effectively reduced to a 2×2 subsystem. Two layers of information are transmitted and represented by $S_1^{(1)}$ and $S_2^{(1)}$. The data $S_1^{(1)}$ is split into two streams, which are weighted with weighting factors $W_1$ and $W_2$, respectively, and transmitted from transmit antennas $40_1$ and $40_2$, respectively. Similarly, the data $S_2^{(1)}$ is split into two streams, which are weighted by weighting factors $W_3$ and $W_4$, respectively, and transmitted from transmit antennas $40_3$ and $40_4$, respectively. FIGS. 8B and 8C illustrate alternative variations in which various layers are transmitted and weighted. Importantly, the channel conditions are used to determine the transmit antennas from which the various layers should be transmitted, as well as identifying the redundant transmit antennas through which beam-forming is provided. Additionally, the channel conditions will also be used to determine the respective weighting factor for the beam-forming layers as well as any weighting factor, if necessary or desired, for the primary layer.

The selection of antennas for the primary or beam-forming layers as well as the respective weighting factors may be calculated at the transmitter, such as the base station 14, the receiver, such as the user element 16, or distributed between the two. For example, channel estimates for each of the channels may simply be determined at the user element 16 and transmitted to the base station 14, which will take the necessary steps to select antennas and weighting factors for transmission. Alternatively, the user element 16 may have knowledge of the configuration of the base station 14 and will select the antennas and provide the appropriate weighting criteria to the base station 14. As such, the base station 14 will simply process the layers as instructed by the user element 16. Those skilled in the art will recognize numerous techniques for distributing this process between the base station 14 and the user element 16; however, the concepts of the present invention remain unaffected by the location of the processing. Further, certain systems, such as time division duplex (TDD) systems, are such that the base station 14 can determine channel conditions and determine channel estimates without the need of feedback from the user element 16. In these instances, most of the processing will be provided in the base station 14.

As noted, the present invention is also beneficial in OFDM environments. In OFDM modulation, the transmission band is divided into multiple, orthogonal carrier waves, which may be referred to as sub-carriers. Each carrier wave is modulated according to the digital data to be transmitted. Because OFDM divides the transmission band into multiple sub-carriers, the bandwidth per sub-carrier decreases and the modulation time per sub-carrier increases. Since the multiple sub-carriers are transmitted in parallel, the transmission rate for the digital data, or symbols, on any given carrier is lower than when a single carrier is used.

OFDM modulation requires the performance of an Inverse Fast Fourier Transform (IFFT) on the information to be transmitted. For demodulation, the performance of a Fast Fourier Transform (FFT) on the received signal is required to recover the transmitted information. In practice, the Inverse Discrete Fourier Transform (IDFT) and Discrete Fourier Transform (DFT) are implemented using digital signal processing for modulation and demodulation, respectively.

Accordingly, the characterizing feature of OFDM modulation is that orthogonal sub-carriers are generated for multiple bands within a transmission channel. The modulated signals are digital signals having a relatively low transmission rate and capable of staying within their respective bands. The individual sub-carriers are not modulated directly by the digital signals. Instead, all sub-carriers are modulated at once by IFFT processing. For further, information regarding OFDM, please see commonly assigned applications U.S. Ser. No. 09/977,540 filed Oct. 15, 2001, U.S. Ser. No. 10/104,399 filed Mar. 22, 2002, U.S. Ser. No. 10/261,739 filed Oct. 1, 2002, and U.S. Ser. No. 60/495,944 filed Aug. 18, 2003, the disclosures of which are incorporated herein by reference in their entireties.

The channel conditions among sub-carriers within an OFDM transmission will also vary. As such, there are normally better sub-carriers for transmission than others as well as better antennas to use for select sub-carriers. For the present invention, the various sub-carriers to be transmitted may be allocated to different transmit antennas 28 depending on channel conditions. Thus, sub-carriers may be transmitted from antennas associated with the best channel conditions. Further, certain sub-carriers may be redundantly transmitted via redundant transmit antennas 28 to effectively reinforce the sub-carrier during propagation to the user element 16, as described above. Weighting may be applied to the primary and redundant sub-carriers and may incorporate controlling the relative power at which the respective sub-carriers are transmitted. In essence, the present invention is applicable to OFDM embodiments, wherein for each sub-carrier, the most appropriate transmit antenna arrangement is selected and various types of weighting may be provided.

Those skilled in the art will recognize improvements and modifications to the preferred embodiments of the present invention. All such improvements and modifications are considered within the scope of the concepts disclosed herein and the claims that follow.

What is claimed is:

1. A wireless communication system comprising:
   a) M antennas;
   b) transmit and control circuitry operatively coupled to the M antennas and adapted to:
      i) select N antennas from the M antennas based on control information;
      ii) create N data streams from information to be transmitted to a receiver;
      iii) transmit the N data streams to the receiver via the N antennas;
      iv) select a redundant antenna other than the N antennas from the M antennas;
      v) apply a weighting factor to one of the N data streams to create a weighted data stream; and
      vi) transmit the weighted data stream to the receiver via the redundant antenna concurrently with the N data streams, wherein transmission of the weighted data stream reinforces the one of the N data streams during transmission.

2. The wireless communication system of claim 1 wherein the control information includes or is derived from channel conditions between the M antennas and a plurality of antennas of the receiver.

3. The wireless communication system of claim 2 wherein the receiver has N antennas.

4. The wireless communication system of claim 1 wherein the transmit and control circuitry are adapted to apply a second weighting factor to the one of the N data streams prior to transmitting the one of the N data streams, wherein the weighted data stream and the one of the N data streams having the second weighting factor are concurrently transmitted.

5. The wireless communication system of claim 1 wherein the weighting factor includes or is derived from channel conditions between the M antennas and a plurality of antennas of the receiver.

6. The wireless communication system of claim 1 wherein the N antennas are selected and the weighting factor is determined to optimize channel capacity.

7. The wireless communication system of claim 1 wherein the N antennas are selected and the weighting factor is determined to optimize signal-to-noise ratios.

8. The wireless communication system of claim 1 wherein the transmit and control circuitry are adapted to:
   a) select a plurality of redundant antennas other than the N antennas from the M antennas;
   b) apply weighting factors to a plurality of the N data streams to create weighted data streams; and
   c) transmit the weighted data streams to the receiver via the redundant antenna concurrently with the N data streams, wherein transmission of the weighted data streams reinforces corresponding ones of the N data streams during transmission.

9. The wireless communication system of claim 8 wherein the transmit and control circuitry are adapted to apply second weighting factors to the corresponding ones of the N data streams prior to transmitting the corresponding ones of the N data streams, wherein the weighted data streams and the corresponding ones of the N data streams having the second weighting factors are concurrently transmitted.

10. The wireless communication system of claim 1 wherein the weighting factor is included in or derived from the control information.

11. The wireless communication system of claim 1 further comprising receive circuitry associated with at least one of the M antennas and the transmit and control circuitry, which is further adapted to receive the control information from the receiver.

12. The wireless communication system of claim 1 wherein to select the N antennas from the M antennas, the transmit and control circuitry is adapted to select the N antennas corresponding to a maximum determinant from channel matrices representing the channel conditions between the M antennas and N antennas of the receiver.

13. The wireless communication system of claim 1 wherein the receiver is a user element and the wireless communication system is a base station.

14. A method providing wireless communications via a wireless communication system comprising having M antennas, the method comprising:
   a) selecting N antennas from the M antennas based on control information;
   b) creating N data streams from information to be transmitted to a receiver;
   c) transmitting the N data streams to the receiver via the N antennas;
   d) selecting a redundant antenna other than the N antennas from the M antennas;
   e) applying a weighting factor to one of the N data streams to create a weighted data stream; and
   f) transmitting the weighted data stream to the receiver via the redundant antenna concurrently with the N data streams, wherein transmission of the weighted data stream reinforces the one of the N data streams during transmission.

15. The method of claim 14 wherein the control information includes or is derived from channel conditions between the M antennas and a plurality of antennas of the receiver.

16. The method of claim 15 wherein the receiver has N antennas.

17. The method of claim 14 further comprising applying a second weighting factor to the one of the N data streams prior to transmitting the one of the N data streams, wherein the weighted data stream and the one of the N data streams having the second weighting factor are concurrently transmitted.

18. The method of claim 14 wherein the weighting factor includes or is derived from channel conditions between the M antennas and a plurality of antennas of the receiver.

19. The method of claim 14 wherein the N antennas are selected and the weighting factor is determined to optimize channel capacity.

20. The method of claim 14 wherein the N antennas are selected and the weighting factor is determined to optimize signal-to-noise ratios.

21. The method of claim 14 wherein steps d, e, and f respectfully comprise:

g) selecting a plurality of redundant antennas other than the N antennas from the M antennas;

h) applying weighting factors to a plurality of the N data streams to create weighted data streams; and i) transmitting the weighted data streams to the receiver via the redundant antenna concurrently with the N data streams, wherein transmission of the weighted data streams reinforces corresponding ones of the N data streams during transmission.

22. The method of claim 21 further comprising applying second weighting factors to the corresponding ones of the N data streams prior to transmitting the corresponding ones of the N data streams, wherein the weighted data streams and the corresponding ones of the N data streams having the second weighting factors are concurrently transmitted.

23. The method of claim 14 wherein the weighting factor is included in or derived from the control information.

24. The method of claim 14 further comprising receiving the control information from the receiver.

25. The method of claim 14 wherein selecting the N antennas from the M antennas comprises selecting the N antennas corresponding to a maximum determinant from channel matrices representing the channel conditions between the M antennas and N antennas of the receiver.

26. The method of claim 14 wherein the receiver is a user element.

27. A wireless communication system comprising:
a) M antennas; and
b) transmit and control circuitry operatively coupled the M antennas and adapted to:
  i) select N antennas from the M antennas based on control information;
  ii) generate a plurality of data streams to be transmitted to a receiver;
  iii) provide an inverse Fourier transform on the data streams to provide a plurality of orthogonal frequency division multiplex sub-carriers, such that the sub-carriers are allocated to the select N antennas based on the control information;
  iv) transmit the sub-carriers via the N antennas to the receiver;
  v) select a redundant antenna other than the N antennas from the M antennas;
  vi) applying a weighing factor to at least one of the sub-carriers for the plurality of data streams to create at least one weighted sub-carrier; and
  vii) transmit the weighted sub-carriers to the receiver via the redundant antenna concurrently with the sub-carriers, wherein transmission of the weighted sub-carriers reinforces the sub-carriers during transmission.

28. The wireless communication system of claim 27 wherein the control information includes or is derived from channel conditions for the sub-carriers between the M antennas and a plurality of antennas of the receiver.

29. The wireless communication system of claim 28 wherein the receiver has N antennas.

30. The wireless communication system of claim 27 wherein the transmit and control circuitry are adapted to apply second weighting factors to the sub-carriers, wherein the weighted sub-carriers and the sub-carriers having the second weighting factors are concurrently transmitted.

31. The wireless communication system of claim 27 wherein the weighting factor includes or is derived from channel conditions between the M antennas and a plurality of antennas of the receiver.

32. A method providing wireless communications via a wireless communication system comprising having M antennas, the method comprising:
a) selecting N antennas from the M antennas based on control information;
b) generating a plurality of data streams to be transmitted to a receiver;
c) providing an inverse Fourier transform on the data streams to provide a plurality of orthogonal frequency division multiplex sub-carriers, such that the sub-carriers are allocated to the select N antennas based on the control information;
d) transmitting the sub-carriers via the N antennas to the receiver;
e) selecting a redundant antenna other than the N antennas from the M antennas;
f) applying a weighting factor to at least one of the sub-carriers for the plurality of data streams to create at least one weighted sub-carrier; and
g) transmitting the weighted sub-carriers to the receiver via the redundant antenna concurrently with the sub-carriers, wherein transmission of the weighted sub-carriers reinforces the sub-carriers during transmission.

33. The method of claim 32 wherein the control information includes or is derived from channel conditions for the sub-carriers between the M antennas and a plurality of antennas of the receiver.

34. The method of claim 33 wherein the receiver has N antennas.

35. The method of claim 32 further comprising applying second weighting factors to the sub-carriers, wherein the weighted sub-carriers and the sub-carriers having the second weighting factors are concurrently transmitted.

36. The method of claim 32 wherein the weighting factor includes or is derived from channel conditions between the M antennas and a plurality of antennas of the receiver.

* * * * *